(12) United States Patent
Jeong

(10) Patent No.: US 7,859,619 B2
(45) Date of Patent: Dec. 28, 2010

(54) LIQUID CRYSTAL DISPLAY DEVICE

(75) Inventor: Ho-Young Jeong, Gyeonggi (KR)

(73) Assignee: LG Display Co., Ltd., Seoul (KR)

( * ) Notice: Subject to any disclaimer, the term of this patent is extended or adjusted under 35 U.S.C. 154(b) by 233 days.

(21) Appl. No.: 12/292,324

(22) Filed: Nov. 17, 2008

(65) Prior Publication Data

US 2009/0273748 A1    Nov. 5, 2009

(30) Foreign Application Priority Data

Apr. 30, 2008    (KR)    ...................... 10-2008-0040383

(51) Int. Cl.
    *G02F 1/1335*    (2006.01)
(52) U.S. Cl. ........................... 349/114; 349/56; 349/84; 349/113; 349/117
(58) Field of Classification Search .................. 349/56, 349/84, 113, 114, 117
    See application file for complete search history.

(56) References Cited

U.S. PATENT DOCUMENTS 7,133,015 B1 *  11/2006  Yoshida et al. ................. 345/99
2009/0224245 A1 *  9/2009  Umezaki ...................... 257/59

FOREIGN PATENT DOCUMENTS

JP    2002-090773    3/2002

\* cited by examiner

*Primary Examiner*—Jennifer Doan
(74) *Attorney, Agent, or Firm*—Morgan Lewis & Bockius LLP

(57) ABSTRACT

A transflective liquid crystal display device includes a liquid crystal panel including first and second substrates and a liquid crystal layer between the first and second substrates, the liquid crystal panel including a plurality of pixel regions each including a pixel electrode; a polarizing plate on an outer surface of the second substrate and having a polarizing axis of a first direction; a selective reflection plate on an outer surface of the first substrate and having a polarizing axis of a second direction, the selective reflection plate reflecting a light having an optical axis different from the second direction; a backlight unit on an outer surface of the selective reflection plate; a gamma reference voltage generating circuit including first and second portions, the first portion generating first gamma reference voltages in a reflective mode, the second portion generating second gamma reference voltages in a transmissive mode; a data driving circuit supplying a data voltage to the pixel electrode using the first and second gamma reference voltages in the reflective and transmissive modes, respectively, wherein the pixel region is a reflective region in the reflective mode, and the pixel region is a transmissive region in the transmissive mode.

13 Claims, 8 Drawing Sheets

LIQUID CRYSTAL DISPLAY DEVICE

The present invention claims the benefit of Korean Patent Application No. 2008-0040383, filed in Korea on Apr. 30, 2008, which is hereby incorporated by reference for all purposes as if fully set forth herein.

BACKGROUND OF THE INVENTION

1. Field of the Invention

The present invention relates to a liquid crystal display device, and more particularly, a reflective liquid crystal display device and a transflective liquid crystal display device.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

FIG. 1 is a plan view illustrating a transflective LCD device according to the related art, and FIG. 2 is a cross-sectional view taken along a line II-II of FIG. 1.

Referring to FIGS. 1 and 2, the transflective LCD device 5 includes an array substrate, a color filter substrate, and a liquid crystal layer between the array substrate and the color filter substrate.

In the array substrate, a gate line 11 and a data line 30 cross each other to define a pixel region P on a first substrate 7. A thin film transistor Tr is formed at the crossing portion of the gate and data lines 11 and 30. The thin film transistor Tr includes a gate electrode 15, a semiconductor layer 20, and source and drain electrodes 32 and 34 spaced apart from each other. A gate insulating layer 17 is on the gate line 11 and the gate electrode 15.

A first passivation layer 38 is on the thin film transistor Tr and the data line 30 and has a first contact hole 40. A transmissive electrode 42 is on the passivation layer 38 in the pixel region P and contacts the drain electrode 34 through the first contact hole 40.

A second passivation layer 48 is on the transmissive electrode 42 and has a second contact hole 50 and a transmissive hole 51 in a transmissive region TA. A reflective electrode 52 is on the second passivation layer 48 in a reflective region RA. The reflective electrode 52 contacts the transmissive electrode 42 through the second contact hole 50.

In the color filter substrate, a black matrix 65 is formed on a second substrate 60 and corresponds to the gate and data lines 11 and 30 and the thin film transistor Tr. A color filter layer 69 including red (R), green (G) and blue (B) color filter patterns 69a, 69b and 69c is formed and corresponds to the pixel region P. A through hole 72 is formed in the respective color filter patterns 69a, 69b and 69c. A common electrode 75 is formed on the color filter layer 69.

As not shown in the drawings, first and second polarizing plates are formed on outer surfaces of the first and second substrates 7 and 60, respectively. A backlight unit is below the first substrate 7 and includes a reflective sheet, a plurality of lamps and a plurality of optical sheets to supply light.

In a reflective mode, the backlight unit is turned off and does not supply light, and an external light reflects on the reflective electrode 52 to display images. In a transmissive mode, the backlight unit is turned on and supplies light, and the light from the backlight unit passes through the transmissive hole 51 in the transmissive region TA to display images.

However, in the related art transflective LCD device, since the pixel region is divided into the reflective region and the transmissive region, when the LCD device is operated in both the reflective mode and the transmissive mode, about 50% of the area of the pixel region is used to display images. Accordingly, in both the reflective mode and the transmissive mode, actual aperture ratio and brightness is reduced, and thus, display quality is degraded.

SUMMARY OF THE INVENTION

Accordingly, the present invention is directed to a liquid crystal display device that substantially obviates one or more of the problems due to limitations and disadvantages of the related art.

An advantage of the present invention is to provide a liquid crystal display device that can improve display quality.

Additional features and advantages of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a transflective liquid crystal display device includes a liquid crystal panel including first and second substrates and a liquid crystal layer between the first and second substrates, the liquid crystal panel including a plurality of pixel regions each including a pixel electrode; a polarizing plate on an outer surface of the second substrate and having a polarizing axis of a first direction; a switching retardation plate on an outer surface of the first substrate and switching operations between a retardation and a non-retardation; a selective reflection plate on an outer surface of the switching retardation plate and having a polarizing axis of a second direction, the selective reflection plate reflecting a light having an optical axis different from the second direction; and a backlight unit on an outer surface of the selective reflection plate, wherein the pixel region is a reflective region in a reflective mode, and the pixel region is a transmissive region in a transmissive mode.

In another aspect, a transflective liquid crystal display device includes a liquid crystal panel including first and second substrates and a liquid crystal layer between the first and second substrates, the liquid crystal panel including a plurality of pixel regions each including a pixel electrode; a polarizing plate on an outer surface of the second substrate and having a polarizing axis of a first direction; a selective reflection plate on an outer surface of the first substrate and having a polarizing axis of a second direction, the selective reflection plate reflecting a light having an optical axis different from the second direction; a backlight unit on an outer surface of the selective reflection plate; a gamma reference voltage generating circuit including first and second portions, the first portion generating first gamma reference voltages in a reflective mode, the second portion generating second gamma reference voltages in a transmissive mode; a data driving circuit supplying a data voltage to the pixel electrode using the first and second gamma reference voltages in the reflective and transmissive modes, respectively, wherein the pixel region is a reflective region in the reflective mode, and the pixel region is a transmissive region in the transmissive mode.

In another aspect, a reflective liquid crystal display device includes a liquid crystal panel including first and second substrates and a liquid crystal layer between the first and second substrates, the liquid crystal panel including a plurality of pixel regions each including a pixel electrode; a polarizing plate on an outer surface of the second substrate; a switching retardation plate on an outer surface of the first substrate and switching operations between a retardation and a non-retardation; and a reflection plate on an outer surface of the switching retardation plate, wherein the pixel region is a reflective region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to illustrated embodiments of the present invention, which are illustrated in the accompanying drawings.

Figure 1:
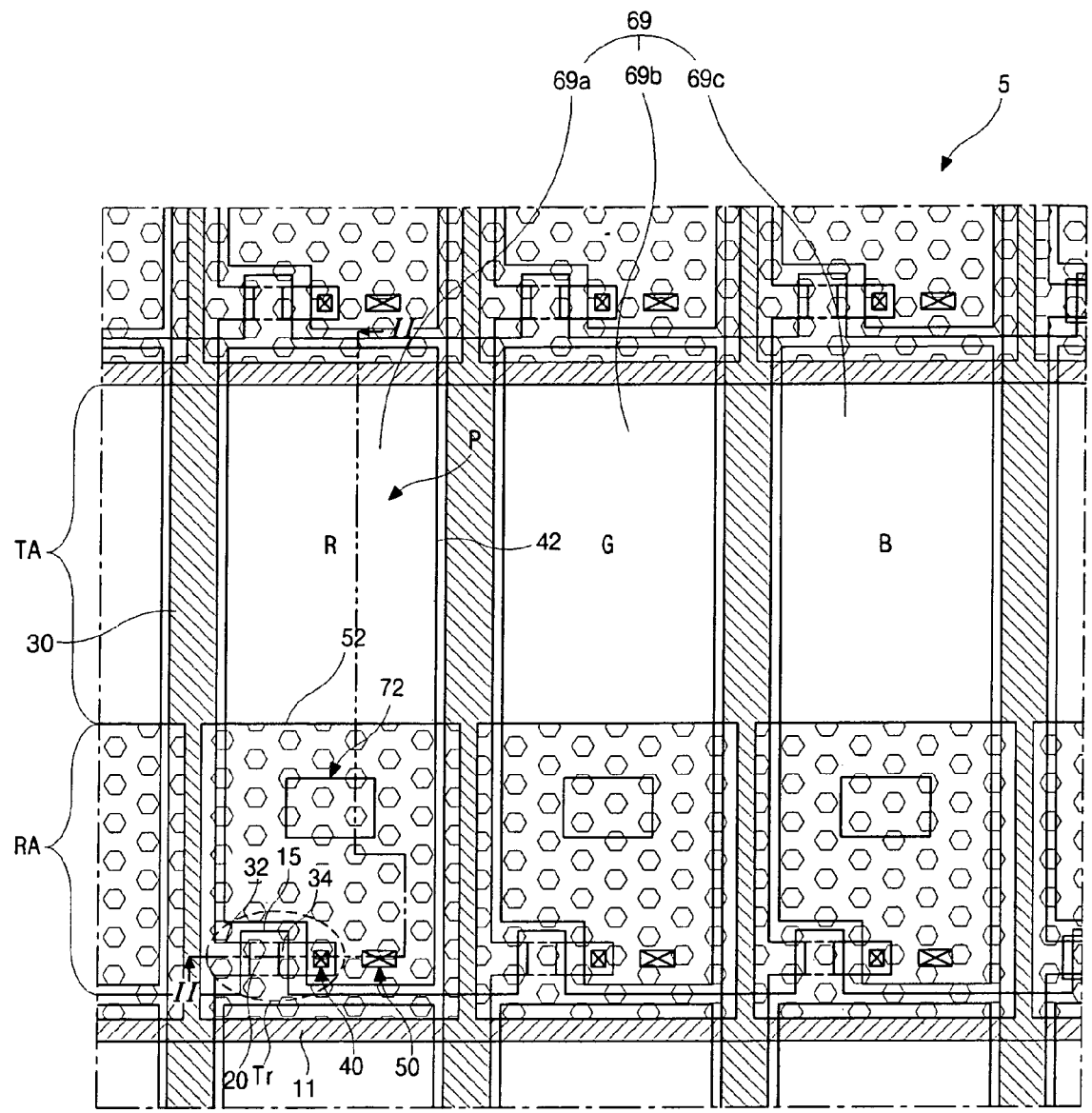
FIG. 1 is a plan view illustrating a transflective LCD device according to the related art.
Figure 2:
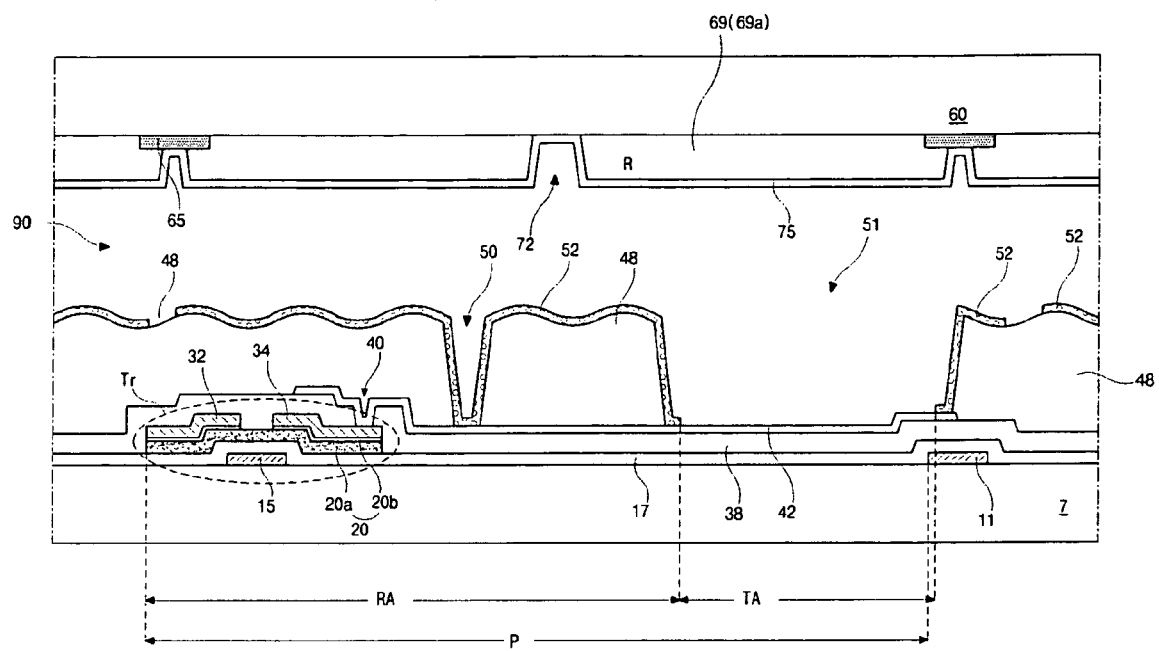
FIG. 2 is a cross-sectional view taken along a line II-II of FIG. 1.
Figure 3:
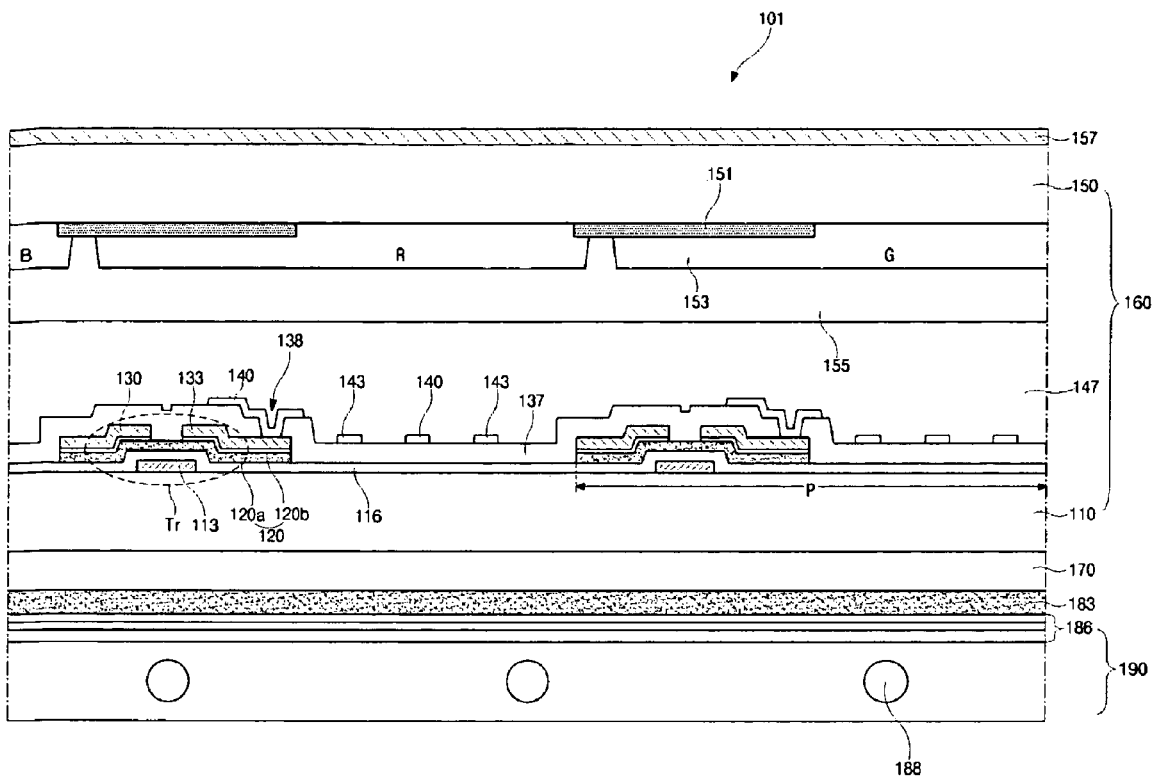
FIG. 3 is a cross-sectional view illustrating a transflective LCD device according to a first embodiment of the present invention.
Figure 4:
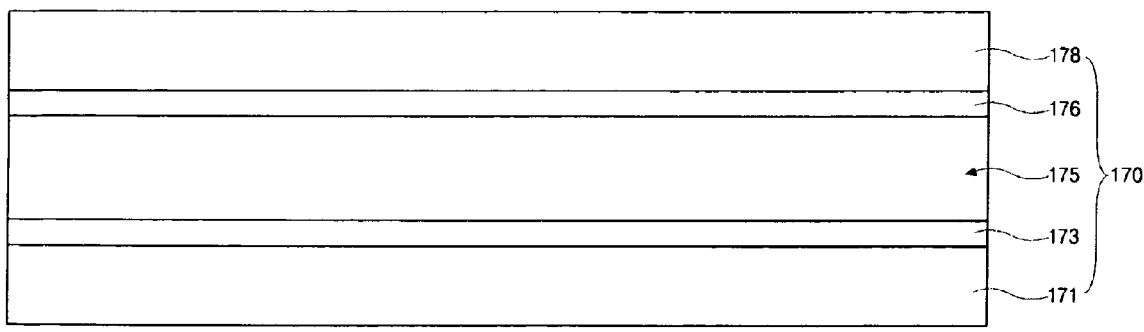
FIG. 4 is a cross-sectional view enlarging the switching retardation plate of FIG. 3.

FIG. 3 is a cross-sectional view illustrating a transflective LCD device according to a first embodiment of the present invention, and FIG. 4 is a cross-sectional view enlarging the switching retardation plate of FIG. 3.

Referring to FIG. 3, the transflective LCD device 101 according to the first embodiment includes a liquid crystal panel 160, which includes an array substrate, a color filter substrate and a first liquid crystal layer 147 between the array substrate and the color filter substrate, a polarizing plate 157 on an outer surface of the color filter substrate, a switching retardation plate 170 on an outer surface of the array substrate, a selective reflection plate 183 on an outer surface of the switching retardation plate 170, and a backlight unit 190 below the selective reflecting plate 183 to supply light in a transmissive mode.

In the LCD device of the first embodiment, the switching retardation plate 170 may function as a switching QWP (quarter wave plate). In other words, the switching retardation plate 170 may switch its operations between a quarter-wave retardation and a non-retardation. The selective reflection plate 183 may have a structure in which a plurality of thin films are laminated and be referred to as a reflection type polarizing plate. Accordingly, the selective reflection plate 183 may has a polarizing axis in a certain direction to transmit light having the same optical axis as the polarizing axis and to reflect light having an optical axis different from the polarizing axis. In other words, the selective reflection plate 183 may function to selectively transmit light depending on the polarizing axis and the optical axis of light.

As not shown in the drawings, gate and data lines cross each other on a first substrate 110 to define a pixel region P. A thin film transistor Tr is formed at the crossing portion of and connected to the gate and data lines. The thin film transistor Tr includes a gate electrode 113, a semiconductor layer 120, and source and drain electrodes 130 and 133 spaced apart from each other. A gate insulating layer 1116 is on the gate line and the gate electrode 113. The semiconductor layer 120 includes an active layer 120a made of intrinsic amorphous silicon and an ohmic contact layer 120b made of extrinsic amorphous silicon.

A passivation layer 137 is on the thin film transistor Tr and the data line and has a drain contact hole 138 exposing the drain electrode 133. A pixel electrode 140 and a common electrode 143 are alternately arranged in the pixel region P on the passivation layer 137. The pixel and the common electrodes 140 and 143 are formed in common in the array substrate and induce an in-plane electric field substantially parallel to a plane of the first substrate 110. The pixel electrode 140 contacts the drain electrode 133 through the drain contact hole 138.

A black matrix 151 is formed on a second substrate 150 and may correspond to at least one of the gate and data lines and the thin film transistor Tr. A color filter layer 153 including red (R), green (G) and blue (B) color filter patterns is formed and corresponds to the pixel region P. A planarization layer 155 is formed on the color filter layer 153.

The liquid crystal panel 160 of FIG. 3 may be referred to as an IPS (in-plane switching) type liquid crystal panel. Alternatively, other type liquid crystal panels may be used For example, TN (twisted nematic) type, ECB (electrically controlled birefringence) type, VA (vertical alignment) type and the like liquid crystal panels can be used. In the other type liquid crystal panels, a pixel electrode and a common electrode are formed in an array substrate and a color filter substrate, respectively, with a liquid crystal layer therebetween. Further, the pixel electrode in such the other type liquid crystal panels may extend over a gate line with a gate insulating layer therebetween to form a storage capacitor. Further, in the other type liquid crystal panels, a common line spaced apart from and parallel to the gate line may be formed in the array substrate, and the pixel electrode overlaps the common line with a gate insulating layer therebetween to form a storage capacitor. Further, in the other type liquid crystal panels, at least one of a color filter layer and a black matrix may be formed in the array substrate along with a thin film transistor.

As shown in the drawings, a seal pattern is formed at peripheral portions of the array substrate and the color filter substrate to attach the array and color filter substrates.

The polarizing axis of the selective reflection plate 183 may be perpendicular to a polarizing axis of the polarizing plate 157.

The backlight unit 190 may include a plurality of lamps 188 parallel to one another and a plurality of optical sheets 186 on the lamps 188. The backlight unit of FIG. 3 may be referred to as a direct type backlight unit. Alternatively, an edge type backlight unit can be used. In the edge type backlight unit, a light guide plate may be further arranged below a plurality of optical sheets, and a lamp may be arranged at a side of the light guide plate.

Referring to FIG. 4, the switching retardation plate 170 may includes third and fourth substrates 171 and 178 facing each other, first and second electrodes 173 and 176 on inner surfaces of the first and second substrates 171 and 178, respectively, and a second liquid crystal layer 175 between the first and second electrodes 173 and 176. First and second alignment layers may be formed on inner surfaces of the first and second electrodes 173 and 176. When an electric field between the first and second electrodes 173 and 176 is one of on and off, the switching retardation plate 170 functions to retard light by $\lambda/4$, and when the electric field is the other of on and off, the switching retardation plate 170 passes light without retardation. The electric field is induced and on when voltages are applied to the first and second electrodes 173 and 176 and there is a voltage difference between the first and second electrodes 173 and 176. The electric field is not induced and off when voltages are not applied to the first and second electrodes 173 and 176 or when voltages are applied to the first and second electrodes 173 and 176 and there is no voltage difference between the first and second electrodes 173 and 176. The retardation of the switching retardation plate 170 depends on various factors, for example, a type of the second liquid crystal molecules, alignment states of the second liquid crystal molecules between before the electric field is on and after the electric field is off due to a rubbing amount of the first and second alignment layers, and a thickness of the second liquid crystal layer 175.

By using the switching retardation plate 170, the transflective LCD device 101 can be operated in common in both reflective and transmissive modes, for example, in a normally white or normally black mode. For example, the transflective LCD device 101 is operated in the normally black mode in both the reflective and transmissive modes. Accordingly, the LCD device 101 in both the reflective and transmissive modes can be operated in the same operating mode.

As described above, the whole pixel region P can be used as a transmissive region in the transmissive mode and a reflective region in the reflective mode. Accordingly, actual aperture ratio and brightness in both the transmissive and reflective modes can increase, and display quality can thus increase.

Further, the LCD device in the reflective mode has a luminance superior to a luminance of the related art LCD device using half the area of the pixel region. Further, the LCD device in the reflective mode under daytime sunlight has a superior luminance superior to a luminance of the LCD device in the transmissive mode. Accordingly, the LCD device has advantage in being used as an outdoor advertising display device.

In more detail, under daytime sunlight, illuminance circumstances of 100K lux on an average are made. Under the circumstances, visibility of a display screen is degraded if a luminance of the display screen does not overcome the illuminance circumstances by the daytime sunlight. Even though the backlight unit 190 has so many lamps, generating luminance of the display screen over 1000 nit by the backlight unit 190 is actually very difficult because power consumption, maintenance costs and the like increase greatly.

Further, even though the display screen has a luminance of about 1000 nit, this luminance is very small compared to the illuminance under the daytime sunlight. In other words, the display screen displays darkly in the daytime compared to surroundings. Accordingly, visibility of images displayed by the display screen is much degraded. For example, an average illuminance at an office equipped with an artificial lightning is about 100 lux, and under this circumstances, the display screen having a luminance of about 1000 nit displays brightly compared to surroundings, and thus, visibility of images displayed is good. However, under the sunlight, since surroundings have a high illuminance, even though the display screen irradiates a luminance of 1000 nit, visibility of images by the display screen is greatly degraded.

Accordingly, when the LCD device of the first embodiment is operated in the reflective mode, since the pixel region P is used as the reflective region, reflecting efficiency is maximized. A luminance of about 2000 nit to 4000 nit, which is greater than the luminance of 1000 nit made maximally by the backlight unit 190, is made by the sunlight, and thus, contrast ratio increases and visibility is improved compared to the transmissive mode.

Further, the transflective LCD device of the first embodiment may not include components such as the reflective electrode, and the second passivation layer having the transmissive hole of the related art LCD device. Accordingly, manufacturing processes and costs can be reduced.

Figure 5A:
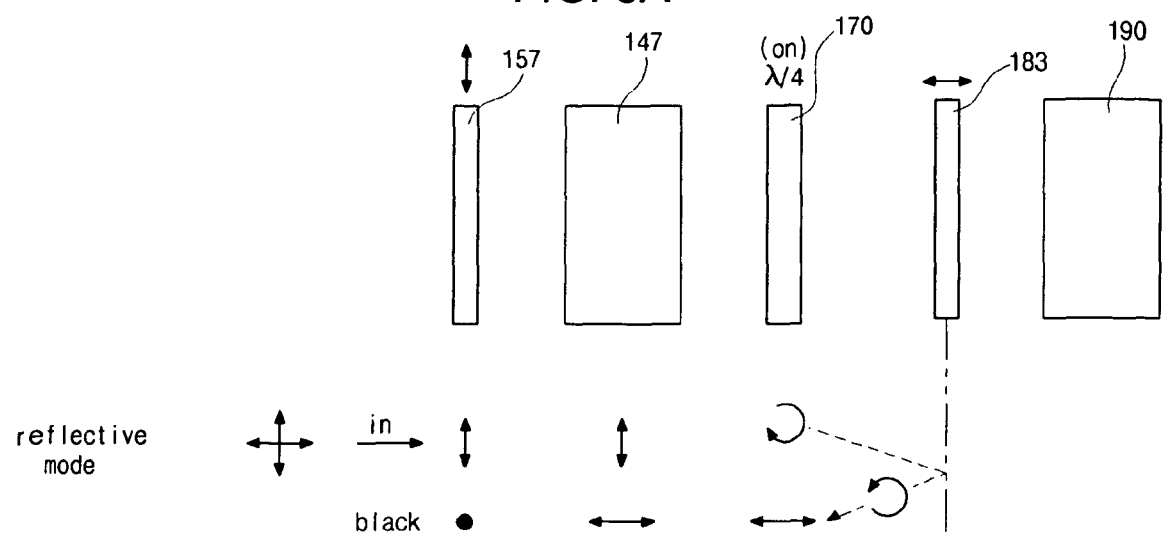
FIGS. 5A and 5B are views illustrating light path and light polarization in a reflective mode and a transmissive mode, respectively, of the LCD device according to the first embodiment of the present invention.
Figure 5B:
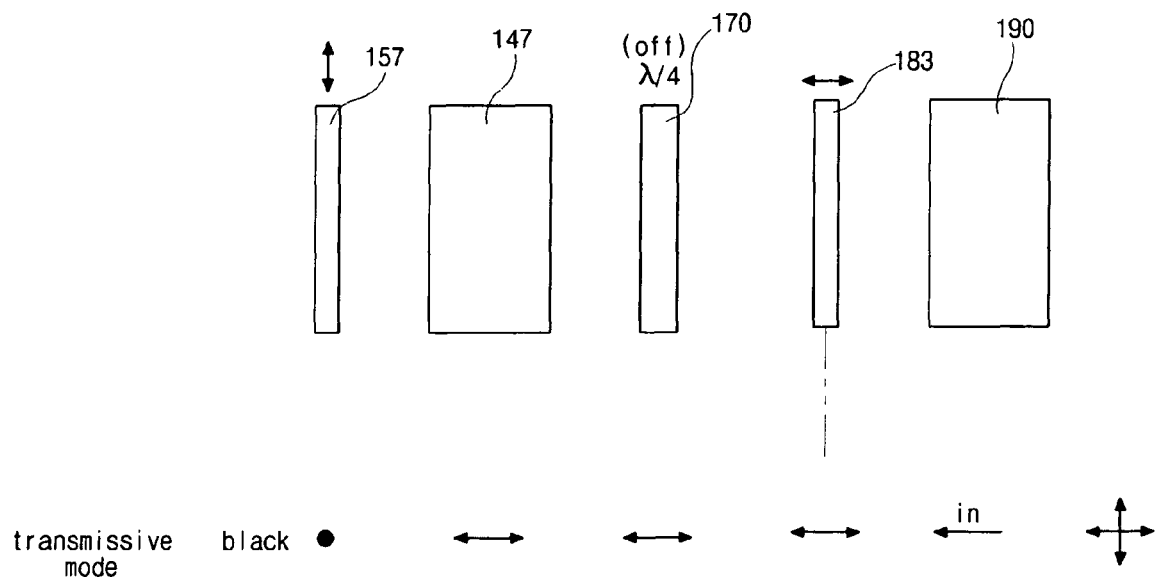

FIGS. 5A and 5B are views illustrating light path and light polarization in a reflective mode and a transmissive mode, respectively, of the LCD device according to the first embodiment of the present invention.

Referring to FIG. 5A, in a reflective mode, an electric field is not induced in a first liquid crystal layer 147 of a liquid crystal panel. A backlight unit 190 is off and does not emit light, and the switching retardation plate 170 is on and an electric field is induced in a second liquid crystal layer of the switching retardation plate 170.

An external light, which is unpolarized, passes through the polarizing plate 157 having a polarizing axis of a first direction, and a first linearly polarized light having an optical axis of the first direction is produced. Then, the first linearly polarized light passes through the first liquid crystal layer 147 without change of the optical axis. Then, the first linearly polarized light passes through the switching retardation plate 170 retarding phase, for example, by $\lambda/4$ and is thus changed into a first circularly polarized light. For example, the first circularly polarized light may be one of a right-handed circularly polarized light and a left-handed circularly polarized light.

Then, the first circularly polarized light is incident on and reflects on a selective reflection plate 183. Components of the first circularly polarized light, which are identical to the polarizing axis of a second direction of the selective reflection plate 183, pass through the selective reflection plate 183 while other components of the first circularly polarized light, which are different from the polarizing axis of the selective reflection plate 183, reflect on the selective reflection plate 183. The second direction is perpendicular to the first direction. The first circularly polarized light is changed in phase by $\lambda/2$ by reflecting on the selective reflection plate 183. Accordingly, the first circularly polarized light is changed into a second circularly polarized light having a circular direction opposite to the circular direction of the first circularly polarized light. In other words, when the first circularly polarized light is one of the right-handed circularly polarized light and the left-handed circularly polarized light, the second circularly polarized light is the other of the right-handed circularly polarized light and the left-handed circularly polarized light.

Then, the second circularly polarized light passes through the switching retardation plate 170 and is thus changed into a second linearly polarized light having an optical axis of the second direction. Then, the second linearly polarized light passes through the first liquid crystal layer 147 without change of the optical axis. Then, the second linearly polarized light is incident on the polarizing plate 157. Since the second linearly polarized light has the optical axis opposite to the polarizing axis of the polarizing plate 157, the second linearly polarized light is blocked by the polarizing plate 157. Through the above processes, the LCD device displays black in the reflective mode when the electric filed is not induced in the first liquid crystal layer 147. In other words, the LCD device in the reflective mode is operated in a normally black mode.

Referring to FIG. 5B, in a transmissive mode, the electric field is not induced in the first liquid crystal layer 147 of the liquid crystal panel. The backlight unit 190 is on and emits light, and the switching retardation plate 170 is off and an electric field is not induced in the second liquid crystal layer of the switching retardation plate 170.

A light, which may be unpolarized, emitting from the backlight unit 190, passes through the selective reflection plate 183 having the polarizing axis of the second direction, and a linearly polarized light having an optical axis of the polarizing axis is produced. Then, the linearly polarized light passes through the switching retardation plate 170 without retardation. Then, the linearly polarized light passes through the first liquid crystal layer 147 without change of the optical axis. Then, the linearly polarized light is incident on the polarizing plate 157. Since the linearly polarized light has the optical axis perpendicular to the polarizing axis of the polarizing plate 157, the linearly polarized light does not pass through the polarizing plate 157. Through the above processes, the LCD device displays black in the transmissive mode when the electric filed is not induced in the first liquid crystal layer 147. In other words, the LCD device in the transmissive mode is operated in the normally black mode.

As described above, the LCD device of the first embodiment in both the reflective and transmissive modes can be operated in the same mode, for example, in the normally black mode.

Figure 6:
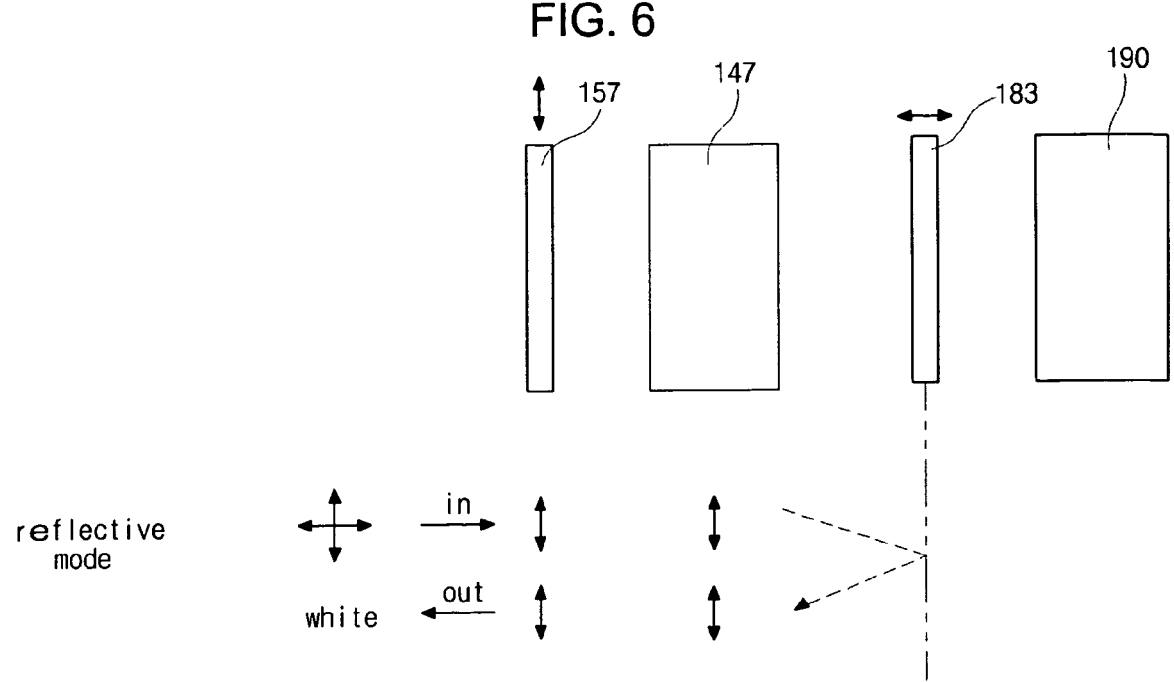
FIG. 6 is a view illustrating light path and light polarization in a reflective mode of an LCD device as a comparative example with the first embodiment of the present invention.

FIG. 6 is a view illustrating light path and light polarization in a reflective mode of an LCD device as a comparative example with the first embodiment.

Referring to FIG. 6, the comparative LCD device does not include the switching retardation plate of the first embodiment of the present invention. Accordingly, when the switching retardation plate is not used, the comparative LCD device in the reflective mode is operated in the normally white mode. Further, the comparative LCD device in the transmissive mode is operated in the normally black mode. In other words, the comparative LCD device is operated in a different manner between in the reflective mode and in the transmissive mode. Accordingly, a difference between a T-V (transmittance-voltage) property and an R-V (reflectance-voltage) property of the comparative LCD device occurs.

However, as described above, the LCD device of the first embodiment of the present invention uses the switching retardation plate, and in both the reflective and transmissive modes, the LCD device can be operated in the same manner. Accordingly, a T-V (transmittance-voltage) property and an R-V (reflectance-voltage) property of the LCD device are similar to each other.

Further, by modifying the transflective LCD device of the first embodiment, a reflective LCD device can be manufactured. For example, the reflective LCD is manufactured by substituting the selective reflection plate with a reflection plate and removing the backlight unit. Such the reflective LCD device does not need a reflection electrode and a passivation layer having a transmissive hole in an array substrate of a liquid crystal panel. Various liquid crystal panels can be used in such the reflective LCD device, for example, TN, IPS, ECB, VA liquid crystal panels and so on.

Figure 7:
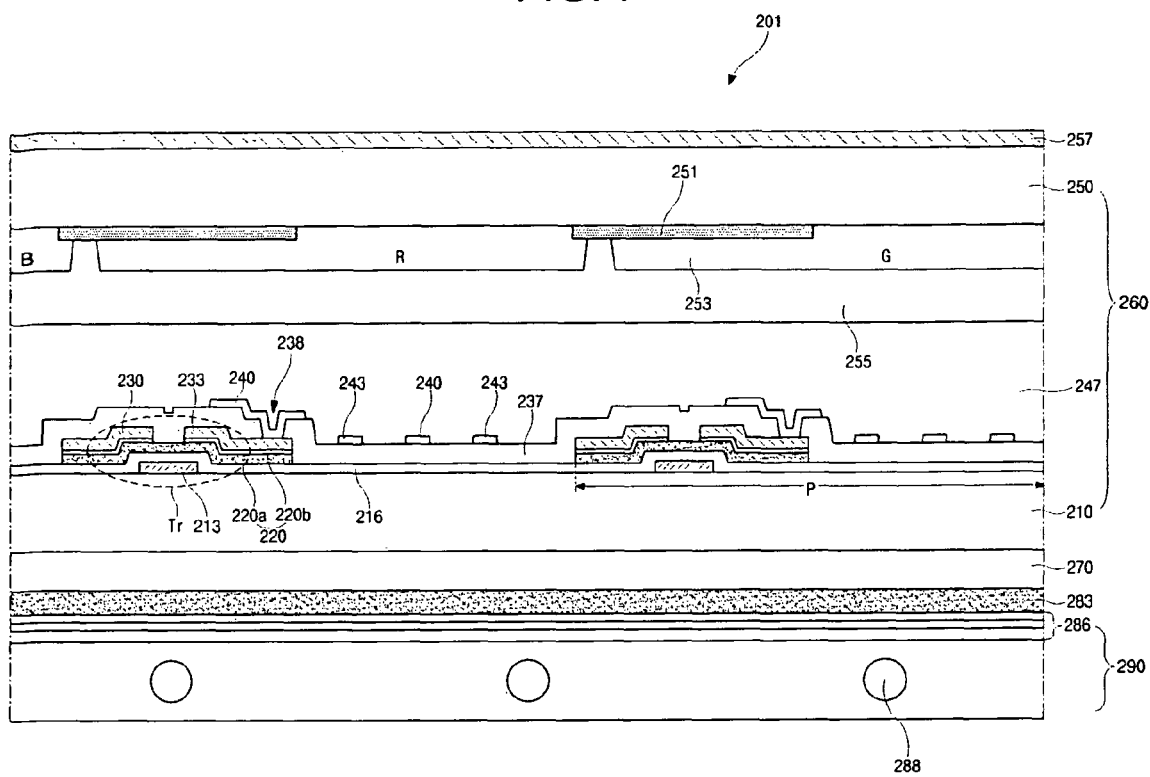
FIG. 7 is a cross-sectional view illustrating a transflective LCD device according to a second embodiment of the present invention.

FIG. 7 is a cross-sectional view illustrating a transflective LCD device according to a second embodiment of the present invention. Explanations similar to those of the first embodiment may be omitted.

Referring to FIG. 7, the transflective LCD device 201 of the second embodiment may have a structure similar to that of the transflective LCD device of the first embodiment, except for the switching retardation plate. For example, the transflective LCD device 201 may use a switching HWP (Half Wave Plate) as the switching retardation plate 270.

Figure 8A:
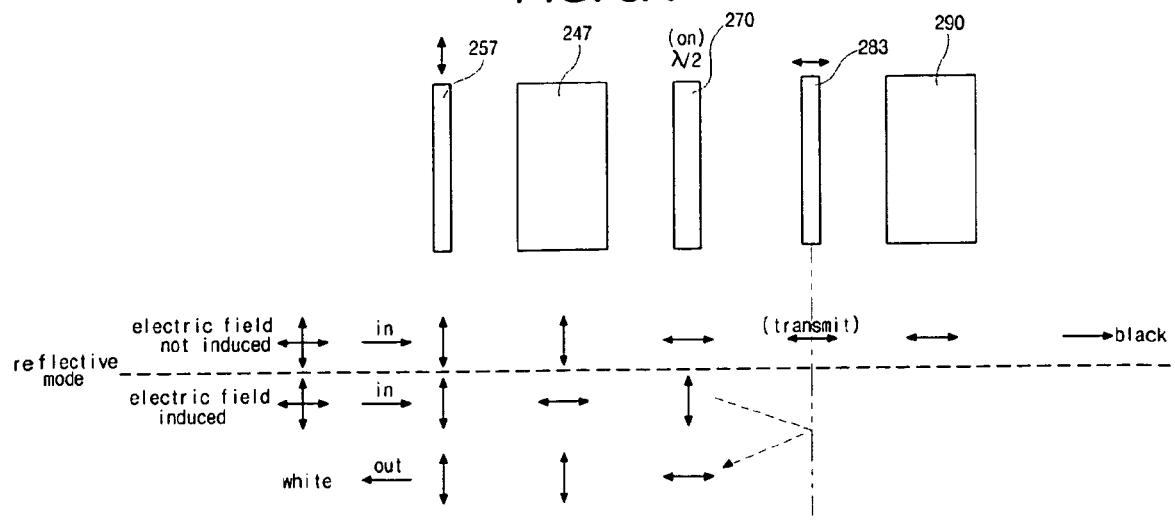
FIGS. 8A and 8B are views illustrating light path and light polarization in a reflective mode and a transmissive mode, respectively, of the LCD device according to the second embodiment of the present invention.
Figure 8B:
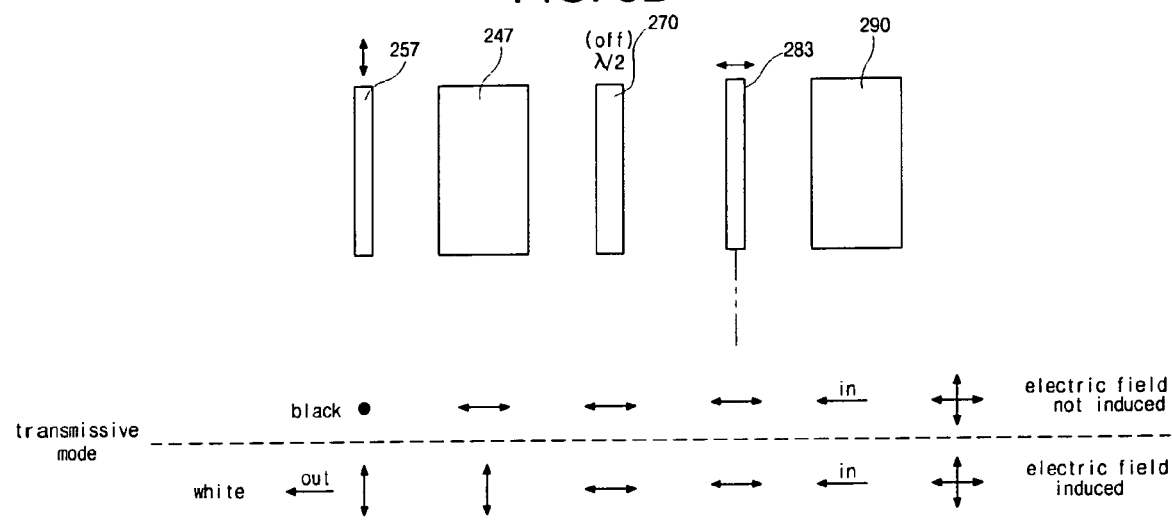

FIGS. 8A and 8B are views illustrating light path and light polarization in a reflective mode and a transmissive mode, respectively, of the LCD device according to the second embodiment of the present invention.

Referring to FIG. 8A, in a reflective mode, an electric field is not induced in a first liquid crystal layer 247. A backlight unit 290 is off and does not emit light, and a switching retardation plate 270 is on and an electric field is induced in a second liquid crystal layer of the switching retardation plate 270.

An external light passes through the polarizing plate 257 having a polarizing axis of a first direction, and a linearly polarized having an optical axis of the first direction is produced. Then, the linearly polarized eight passes through the first liquid crystal layer 247 without change of the optical axis. Then, the linearly polarized light passes through the switching retardation plate 270 retarding phase by $\lambda/2$ and the optical axis of the linearly polarized light is thus changed into a second direction perpendicular to the first direction. Then, the linearly polarized light is incident on a selective reflection plate 283 having a polarizing axis of the second direction. Since the optical axis of the linearly polarized light is identical with the polarizing axis of the selective reflection plate 283, the linearly polarized light does not reflect on but passes through the selective reflection plate 283. Through the above processes, the LCD device displays black in the reflective mode when the electric filed is not induced in the first liquid crystal layer 247.

In the reflective mode, an electric field is induced in the first liquid crystal layer 247. The backlight unit 290 is off and does not irradiate light, and the switching retardation plate 270 is on and an electric field is induced in the second liquid crystal layer of the switching retardation plate 270.

An external light passes through the polarizing plate 257, and a linearly polarized having an optical axis of the first direction is produced. Then, the linearly polarized light passes through the first liquid crystal layer 247 and is changed in phase. For example, the first liquid crystal layer 247 may function to retard phase by $\lambda/2$, and the optical axis of the linearly polarized light is thus changed into the second direction perpendicular to the first direction. Then, the linearly polarized light passes through the switching retardation plate 270 and the optical axis of the linearly polarized light is thus changed into the first direction. Then, the linearly polarized light is incident on the selective reflection plate 283. Since the optical axis of the linearly polarized light is perpendicular to the polarizing axis of the selective reflection plate 283, the linearly polarized light reflects on and has the optical axis of the first direction. Then, the linearly polarized light passes through the switching retardation plate 270 and has the optical axis of the second direction. Then, the linearly polarized light passes through the first liquid crystal layer 247 and has the optical axis of the first direction. Then, the linearly polarized light passes through the polarizing plate 257. Through the above processes, the LCD device displays white in the reflective mode when the electric filed is induced in the first liquid crystal layer 247.

Referring to FIG. 8B, in a transmissive mode, an electric field is not induced in the first liquid crystal layer 247. The backlight unit 290 is on and irradiates a light, and the switching retardation plate 270 is off and an electric field is not induced in the second liquid crystal layer of the switching retardation plate 270.

A light emitting from the backlight unit 290 passes through the selective reflection plate 283 and a linearly polarized light having an optical axis of the second direction is produced. Then, the linearly polarized light passes through the switching retardation plate 270 without retardation. Then, the linearly polarized light passes through the first liquid crystal layer 247. Then, the linearly polarized light is incident on the polarizing plate 257. Since the optical axis of the linearly polarized light is perpendicular to the polarizing axis of the first direction of the polarizing plate 257, the linearly polarized light does not pass through the polarizing plate 257. Through the above processes, the LCD device displays black in the transmissive mode when the electric field is not induced in the first liquid crystal layer 247.

In the transmissive mode, an electric field is induced in the first liquid crystal layer 247. The backlight unit 290 is on and irradiates a light, and the switching retardation plate 270 is off and an electric field is not induced in the second liquid crystal layer of the switching retardation plate 270.

A light emitting from the backlight unit 290 passes through the selective reflection plate 283 and a linearly polarized light having an optical axis of the second direction is produced. Then, the linearly polarized light passes through the switching retardation plate 270 without retardation. Then, the linearly polarized light passes through the first liquid crystal layer 247 and the optical axis of the linearly polarized light is changed into the first direction. Then, the linearly polarized light is incident on the polarizing plate 257. Since the optical axis of the linearly polarized light is identical with the polarizing axis of the polarizing plate 257, the linearly polarized light passes through the polarizing plate 257. Through the above processes, the LCD device displays white in the transmissive mode when the electric field is induced in the first liquid crystal layer 247.

As described above, as described above, the LCD device of the second embodiment of the present invention uses the switching retardation plate, and in both the reflective and transmissive modes, the LCD device can be operated in the same manner. Accordingly, a T-V (transmittance-voltage) property and an R-V (reflectance-voltage) property of the LCD device are similar to each other.

Further, by modifying the transflective LCD device of the second embodiment, a reflective LCD device can be manufactured. For example, the reflective LCD is manufactured by substituting the selective reflection plate with a reflection plate and removing the backlight unit. Such the reflective LCD device does not need a reflection electrode and a passivation layer having a transmissive hole in an array substrate of a liquid crystal panel. Various liquid crystal panels can be used in such the reflective LCD device, for example, TN, IPS, ECB, VA liquid crystal panels and so on.

Figure 9:
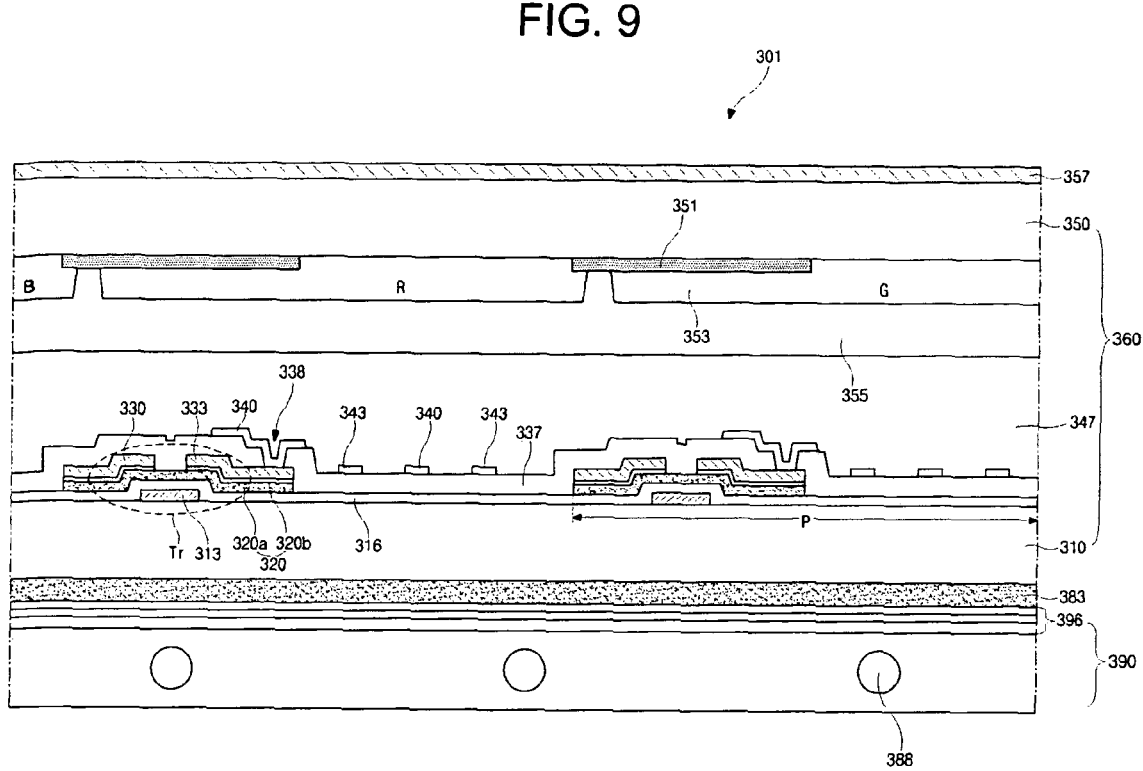
FIG. 9 is a cross-sectional view illustrating a transflective LCD device according to a third embodiment of the present invention.

FIG. 9 is a cross-sectional view illustrating a transflective LCD device according to a third embodiment of the present invention. Explanations similar to those of the first and second embodiments may be omitted.

Referring to FIG. 9, the transflective LCD device 301 of the third embodiment may have a structure similar to that of the transflective LCD device of the first and second embodiments, except for the switching retardation plate. For example, the transflective LCD device 301 may not use the switching retardation plate of the first and second embodiments. Accordingly, the transflective LCD device 301 is operated in a normally black mode in a reflective mode and operated in a normally white mode in a transmissive mode in similar to the transflective LCD device of FIG. 6. Accordingly, a difference between a T-V property and an R-V property of the comparative LCD device occurs.

Such the difference may be resolved through gamma value compensation. To do this, a gamma reference voltage generating circuit may include first and second portions.

For example, when the reflective mode uses the normally white mode and the transmissive mode uses the normally black mode, a gamma value appropriate for the reflective mode is different from a gamma value appropriate for the transmissive mode. Accordingly, the first portion generates gamma reference voltages appropriate for the reflective mode, and the second portion generates gamma reference voltages appropriate for the transmissive mode. When the reflective mode is performed, one of the first and second portions is selected and outputs the corresponding gamma reference voltages. When the transmissive mode is performed, the other of the first and second portions is selected and outputs the corresponding gamma reference voltages. Since the gamma reference voltages are switched appropriately for the reflective mode and the transmissive mode, the property difference between the reflective mode and the transmissive mode can be resolved. Further, since the switching retardation plate is not used, a transmissivity of the LCD device increases.

The gamma reference voltages outputted from one of the first and second portions in the reflective and transmissive modes, respectively, are supplied to a data driving circuit. The data driving circuit converts data signals into data voltages using the gamma reference voltages and outputs the data voltages to the pixels of the liquid crystal panel 360.

As described in the embodiments, the transflective LCD device can use the whole pixel region as the efficient display region in both the reflective and transmissive modes. Accordingly, the aperture ratio, brightness and contrast ratio can greatly increase.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A transflective liquid crystal display device, comprising:
   a liquid crystal panel including first and second substrates and a liquid crystal layer between the first and second substrates, the liquid crystal panel including a plurality of pixel regions each including a pixel electrode;
   a polarizing plate on an outer surface of the second substrate and having a polarizing axis of a first direction;
   a switching retardation plate on an outer surface of the first substrate and switching operations between a retardation and a non-retardation;
   a selective reflection plate on an outer surface of the switching retardation plate and having a polarizing axis of a second direction, the selective reflection plate reflecting a light having an optical axis different from the second direction; and
   a backlight unit on an outer surface of the selective reflection plate,
   wherein the pixel region is a reflective region in a reflective mode, and the pixel region is a transmissive region in a transmissive mode.

2. The device according to claim 1, wherein the switching retardation plate is one of a switching quarter wave plate and a switching half wave plate.

3. The device according to claim 1, wherein the switching retardation plate includes:
   third and fourth substrates;
   first and second electrodes on inner surfaces of the third and fourth substrates, respectively; and
   a second liquid crystal layer between the first and second electrodes,
   wherein the retardation is performed one of when an electric field is induced in the second liquid crystal layer and when the electric field is not induced in the second liquid crystal layer, and the non-retardation is performed the other of when the electric field is induced in the second liquid crystal layer and when the electric field is not induced in the second liquid crystal layer.

4. The device according to claim 1, wherein the first direction is perpendicular to the second direction.

5. The device according to claim 1, wherein the transflective liquid crystal display device is operated in one of a normally black mode and a normally white mode in both the reflective and transmissive modes.

6. The device according to claim 1, wherein the liquid crystal panel is one of TN, IPS, VA, ECB type liquid crystal panels.

7. A transflective liquid crystal display device, comprising:
   a liquid crystal panel including first and second substrates and a liquid crystal layer between the first and second substrates, the liquid crystal panel including a plurality of pixel regions each including a pixel electrode;
   a polarizing plate on an outer surface of the second substrate and having a polarizing axis of a first direction;
   a selective reflection plate on an outer surface of the first substrate and having a polarizing axis of a second direction, the selective reflection plate reflecting a light having an optical axis different from the second direction;
   a backlight unit on an outer surface of the selective reflection plate;
   a gamma reference voltage generating circuit including first and second portions, the first portion generating first gamma reference voltages in a reflective mode, the second portion generating second gamma reference voltages in a transmissive mode; and
   a data driving circuit supplying a data voltage to the pixel electrode using the first and second gamma reference voltages in the reflective and transmissive modes, respectively,
   wherein the pixel region is a reflective region in the reflective mode, and the pixel region is a transmissive region in the transmissive mode.

8. The device according to claim 7, wherein the first direction is perpendicular to the second direction.

9. The device according to claim 7, wherein the transflective liquid crystal display device is operated in one of a normally black mode and a normally white mode in the reflective mode and in the other of the normally black mode and the normally white mode in the transmissive mode.

10. The device according to claim 7, wherein the liquid crystal panel is one of TN, IPS, VA, ECB type liquid crystal panels.

11. A reflective liquid crystal display device, comprising:
    a liquid crystal panel including first and second substrates and a liquid crystal layer between the first and second substrates, the liquid crystal panel including a plurality of pixel regions each including a pixel electrode;
    a polarizing plate on an outer surface of the second substrate;
    a switching retardation plate on an outer surface of the first substrate and switching operations between a retardation and a non-retardation; and
    a reflection plate on an outer surface of the switching retardation plate,
    wherein the pixel region is a reflective region.

12. The device according to claim 11, wherein the switching retardation plate is one of a switching quarter wave plate and a switching half wave plate.

13. The device according to claim 11, wherein the switching retardation plate includes:
    third and fourth substrates;
    first and second electrodes on inner surfaces of the third and fourth substrates, respectively; and
    a second liquid crystal layer between the first and second electrodes,
    wherein the retardation is performed one of when an electric field is induced in the second liquid crystal layer and when the electric field is not induced in the second liquid crystal layer, and the non-retardation is performed the other of when the electric field is induced in the second liquid crystal layer and when the electric field is not induced in the second liquid crystal layer.

* * * * *